United States Patent Office 2,884,423
Patented Apr. 28, 1959

2,884,423

PHTHALOPERINE DERIVATIVES

Donald Graham Wilkinson, Manchester, England, assignor to Imperial Chemical Industries Limited, London, England, a corporation of Great Britain No Drawing. Application October 5, 1956
Serial No. 614,087

Claims priority, application Great Britain
October 7, 1955

7 Claims. (Cl. 260—256.4)

This invention relates to new colouring matters.

According to our invention we provide new colouring matters of the formula:

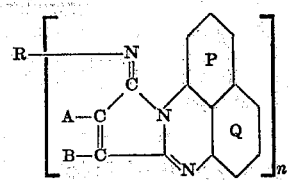

wherein R is an alkyl, cycloalkyl, aralkyl, aryl or heterocyclic radical, A and B are substituted or unsubstituted hydrocarbon radicals which may be joined together to form a homocyclic or heterocyclic ring system, $n$ is 1, 2 or 3, and the nuclei P and Q may carry substituents.

According to a further feature of our invention we provide a process for the manufacture of new colouring matters which comprises heating a primary alkyl, cycloalkyl, aralkyl, aryl or heterocyclic amine with a polycyclic compound of the formula:

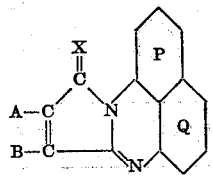

where A and B are substituted or unsubstituted hydrocarbon radicals which may be joined together to form a homocyclic or heterocyclic ring system, X is NH or S, and the nuclei P and Q may carry substituents.

The substituents in the nuclei P and Q may be for example halogen atoms or alkyloxy groups or the nuclei may be substituted by an ethylene radical connected to the carbon atoms in the peri positions.

The substituents on the radicals A and B and the ring system formed by joining them, may be for example alkyl or alkyloxy radicals or halogen atoms. The primary amine may also carry such substituents.

As examples of suitable primary amines there may be mentioned the monoamines such as aniline, p-phenetidine, dehydrothio-p-toluidine, benzylamine, 3-nitraniline, 4-nitraniline, 1-naphthylamine, 2-naphthylamine and 3-aminopyrene, the diamines such as m- or p-phenylenediamine, benzidine, tolidine, 1:5-naphthylenediamine, 2:5-dichloro-p-phenylenediamine, 2:5-dimethyl-p-phenylenediamine, 4:4′-diaminodiphenylsulphone, 4:4′-diaminostilbene, 3:8-diaminopyrene, 3:10-diaminopyrene, 2:7-diaminofluorenone, 3:8-diaminobenzofurane, 2:7-diaminodiphenylenesulphone, 1:4-naphthylenediamine, 1:6-naphthylenediamine, 1:7-naphthylenediamine, 2:6-naphthylenediamine, 2:7-naphthylenediamine, 3:3′-dimethoxy-4:4′-diaminodiphenyl, 2:2′-dinitro-4:4′-diamino-diphenyl, 2:2′-di(trifluoromethyl)4:4′-diaminodiphenyl, 3:3′-dichlorobenzidine and α:β-di-(4-aminophenoxy)-ethane and the triamines such as 1:3:5-triaminobenzene. When diamines and triamines are used in suitable proportions, the colouring matters may be formed by linking together two or more molecules of polycyclic compound.

As suitable polycyclic compounds for use as starting materials in the process of our invention there may be mentioned for example 12-imino-phthaloperine and 12-thiophthaloperinone, and their substitution products.

The polycyclic compounds used as starting materials in which X is S may be made from the corresponding keto compound by methods known from the literature or used in practice for replacing the oxygen atom of a carbonyl group, or the hydrogen atoms of a methylene group, by sulphur. Thus for example 12-thiophthaloperinone may be made from phthaloperinone by the action of phosphorus pentasulphide or from phthaloperine by heating with sulphur.

The polycyclic compounds in which X is NH or S may be made by heating 1:8-naphthylene diamine or a substituted 1:8-naphthylene diamine with a dinitrile of the formula:

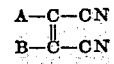

a cyanothioamide of the formula:

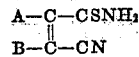

or with a compound containing a 5-membered ring which in one of its tautomeric forms has the formula:

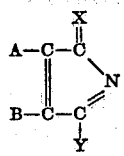

or with an alcohol addition product or mercaptan addition product thereof wherein A, B and X have the meaning given above and Y is a replaceable monovalent atom or group.

As an example of a suitable dinitrile there may be mentioned phthalonitrile and as an example of a suitable cyanothioamide there may be mentioned o-cyano-thiobenzamide.

The group Y in the above formula may be for example O-alkyl, —SH, —S-alkyl, —NH₂ or —NHR₁ where R₁ is a hydrocarbon or substituted hydrocarbon radical. As specific examples of suitable ring compounds which can be used to make the polycyclic compounds there may be mentioned 1-imino-3-amino-isoindolenine, imino-thiophthalimidine (a tautomeric form of 1-imino-3-mercapto-isoindolenine), 1-imino-3-ethylmercaptoisoindolenine, 1-imino-3-anilino-isoindolenine and 1-phenylimino-3-anilino-isoindolenine. As suitable alcohol and mercaptan addition products there may be mentioned 1-imino-3:3-dibenzylmercapto-isoindoline, 1-imino-3:3-di-ethoxy-isoindoline and 1-imino-3:3-(ethylene-dioxy)-isoindoline.

The reaction of the polycyclic compound with the primary amine may be conveniently brought about by heating the reagents together in an organic solvent for example diphenylamine or nitrobenzene. It is sometimes convenient to use the primary amine in the form of a salt for example the hydrochloride. The new colouring matters may then be isolated by cooling and filtering the reaction mixture and washing and drying the residue on the filter. The product may be purified by crystallisation if desired.

The new colouring matters of our invention are bright pigments of high tinctorial strength and high stability to heat and light and they are especially valuable for colouring plastic materials which are to be moulded, for lacquer, paints and varnishes, and for use in the mass colouration of polymeric materials which are to be drawn into fibres and films. They may also be used in the form of aqueous dispersions for dyeing artificial fibres.

The invention is illustrated but not limited by the following examples in which the parts are by weight:

Example 1

A mixture of 1 part of 12-imino-phthaloperine, 1 part of p-phenetidine and 4 parts of diphenylamine is stirred at 280° C. for 1 hour. The mixture is cooled to 100° C., 4 parts of nitrobenzene are added and the mixture is then cooled to 20° C. The solid product in suspension is filtered off, washed with benzene and dried. 12-p-ethoxyphenylimino-phthaloperine is thus obtained in the form of orange needle-shaped crystals which melt at 264–266° C.

When analysed the product is found to contain 80.2% of carbon, 4.6% of hydrogen and 10.8% of nitrogen ($C_{20}H_{19}N_3O$ requires 80.1% of carbon, 4.9% of hydrogen and 10.8% of nitrogen).

Example 2

A mixture of 1 part of 12-imino-phthaloperine and 1 part of anilinehydrochloride is stirred with 4.5 parts of nitrobenzene at 240–260° C. for 2 hours. The mixture is cooled and the solid product in suspension is filtered off and washed first with nitrobenzene then with hot ethanol and finally with hot water to remove the excess aniline hydrochloride. The product is then dried. 12-phenylimino-phthaloperine is thus obtained in the form of reddish-orange crystals which melt at 237–238° C.

When analysed the product is found to contain 83.1% of carbon, 4.2% of hydrogen and 11.6% of nitrogen ($C_{24}H_{15}N_3$ requires 83.5% of carbon, 4.3% of hydrogen and 12.2% of nitrogen).

Example 3

In place of the 1 part of aniline hydrochloride used in Example 2 there are used 1.7 parts of the hydrochloride of dehydrothio-p-toluidine. 12-p-(6-methylbenzthiazolyl-2-)phenyliminophthaloperine is obtained in the form of red crystals.

Brown or red pigments are obtained when the following amine hydrochlorides are used in place of aniline hydrochloride in the process of Example 2.

| Amine hydrochloride | Melting point of pigment | Shade |
| --- | --- | --- |
| 3-nitraniline | 275–280° C | brown. |
| 4-nitraniline | 266–274° C | reddish brown. |
| 1-naphthylamine | 240–250° C | reddish brown. |
| 3-aminopyrene | 300–305° C | bluish red. |
| 4-methoxy-3-aminobenzene-sulphondiethylamide | 215–220° C | yellowish brown. |
| 2-naphthylamine | 260–265° C | reddish brown. |
| 2-naphthylamine-6-sulphonamide | 290–300° C (dec.) | reddish brown. |

Example 4

A mixture of 15 parts of 12-imino-phthaloperine, 2 parts of p-phenylene diamine and 40 parts of diphenylamine is stirred at 280° C. for 1 hour, during which time ammonia is evolved. The mixture is cooled, diluted with 50 parts of nitrobenzene and allowed to stand for 12 hours. The solid in suspension is filtered off, washed with nitrobenzene and then with benzene and dried. The product is crystallised from chloro naphthalene when p-phenylene-bis-(12-imino-phthaloperine) is obtained in the form of shining dark purplish red crystals which melt above 430° C. When analysed the product is found to contain 82.7% of carbon, 4.3% of hydrogen and 13.5% of nitrogen ($C_{42}H_{24}N_6$ requires 82.4% of carbon, 3.9% of hydrogen and 13.7% of nitrogen). The product is a red pigment which is very stable to heat and light.

Example 5

In place of the 2 parts of p-phenylene diamine used in Example 4, 2 parts of m-phenylene diamine are used. A similar pigment which melts above 400° C. is obtained.

Example 6

In place of the 2 parts of p-phenylene diamine used in Example 4 there are used 3.4 parts of benzidine. The red condensation product so formed melts above 450° C. It is a red pigment, yellower in shade than the pigment of Example 4 and is very stable to heat and to light. When analysed the product is found to contain 82.9% of carbon, 4.1% of hydrogen and 11.7% of nitrogen. ($C_{48}H_{28}N_6$ requires 82.6% of carbon, 4.1% of hydrogen and 12.2% of nitrogen.)

Example 7

In place of the 2 parts of p-phenylene diamine used in Example 4 there are used 4 parts of tolidine (3:3′-dimethyl-4:4′-diamino-diphenyl). The pigment so obtained melts at 400–405° C. and is similar in shade to the pigment of Example 6.

Example 8

A mixture of 100 parts of 12-imino-phthaloperine, 29 parts of 1:5-naphthylene diamine dihydrochloride and 450 parts of nitrobenzene is stirred at 240° C. for 2 hours. The reaction mixture is cooled and filtered and the solid residue on the filter is washed with nitrobenzene, then with alcohol and finally with water to remove the excess base hydrochloride. It is then dried. 1:5-naphthylene-bis-(12-imino-phthaloperine) is thus obtained in the form of a red pigment which is very sparingly soluble in water and which melts above 450° C. It is very stable to heat and light.

Brown or red pigments are obtained when the following diamine dihydrochlorides are used in place of 1:5-naphthylene diamine dihydrochloride in the process of Example 8:

| Diamine dihydrochloride | Melting point of pigment | Shade |
| --- | --- | --- |
| 2:5-dichloro-p-phenylene diamine | above 450° C | brownish red. |
| 2:5-dimethyl-p-phenylene diamine | above 400° C | red. |
| 3:3′-dichloro-4:4′-diaminodiphenyl | 378–380° C | brown. |
| α:β-di(4-aminophenoxy)-ethane | 365–368° C | orange brown. |
| 2-chloro-p-phenylenediamine | 390–393° C | red. |
| 1:4-naphthylenediamine | 390–395° C | bluish red. |
| 1:6-naphthylenediamine | above 440° C | orange red. |
| 1:7-naphthylenediamine | 390–393° C | red. |
| 2:6-naphthylenediamine | above 450° C | red. |
| 2:7-naphthylenediamine | 405–415° C | orange red. |
| 2:2′-dichloro-4:4′-diamino-diphenyl | 390–395° C | brown. |
| 2:2′-dimethyl-4:4′-diamino-diphenyl | 400–405° C | orange brown. |
| 2:2′-dinitro-4:4′-diamino-diphenyl | 370–373° C | reddish brown. |
| 2:2′-di(trifluoromethyl)-4:4′-diamino-diphenyl | 375–378° C | orange red. |
| 3:3′-dimethoxy-4:4′-diaminodiphenyl | 397–408° C | reddish brown. |
| 4:4′-diaminodiphenylsulphone | above 450° C | orange. |
| 4:4′-diaminostilbene | above 450° C | orange red. |
| 3:8-diaminopyrene | above 450° C | bluish red. |
| 3:10-diaminopyrene | above 450° C | brownish red. |
| 2:7-diaminofluorenone | above 450° C | reddish brown. |
| 3:8-diaminodibenzofurane | 424–434° C | reddish brown. |
| 2:7-diaminodiphenylenesulphone | above 440° C | reddish brown. |

Example 9

A mixture of 20 parts of 12-imino-phthaloperine, 4 parts of 1:5-naphthylene diamine, 5 parts of p-toluene sulphonic acid and 140 parts of chloronaphthalene is stirred at 220° C. for 4 hours. The mixture is cooled and the solid product in suspension is filtered off, washed with chloronaphthalene then with benzene, and finally with ethanol and dried. The product so obtained is identical with the first pigment described in Example 8.

Example 10

A mixture of 15 parts of 12-thio-phthaloperine, 2 parts of p-phenylenediamine and 40 parts of diphenylamine is stirred at 250° C. for 4 hours. The mixture is cooled, 40 parts of nitrobenzene are added and the crystalline solid in suspension is filtered off, washed with nitrobenzene then with benzene and finally with ethanol and dried. The product so obtained is identical with that obtained by the process of Example 4.

Example 11

A mixture of 28 parts of chloro-12-imino-phthaloperine, 5.5 parts of p-phenylenediamine dihydrochloride and 120 parts of nitrobenzene is stirred at 220° C. for 4 hours. The mixture is cooled to 100° C. and the solid product in suspension is filtered off, washed with nitrobenzene, benzene and then with ethanol and dried. The pigment so obtained melts above 450° C., and is bluer in shade than the pigment of Example 4.

Example 12

In place of the 5.5 parts of p-phenylenediamine dihydrochloride used in Example 11 there are used 5.5 parts of m-phenylenediamine dihydrochloride. A red pigment is obtained which melts at 394–397° C.

Example 13

In place of the 28 parts of chloro-12-imino-phthaloperine used in Example 11 there are used 28.5 parts of nitro-12-imino-phthaloperine. A violet-black crystalline product is obtained which melts above 440° C.

Example 14

A mixture of 30 parts of 12-imino-phthaloperine, 6.5 parts of 1:3:5-triaminobenzene trihydrochloride and 180 parts of chloronaphthalene is stirred at 200° C. for 2 hours and then at 220° C. for a further 2 hours. The mixture is cooled and the solid in suspension is filtered off and washed with nitrobenzene, then with benzene and finally with ethanol and dried. A dark brown crystalline product is obtained which melts above 400° C.

Example 15

In place of the 28 parts of chloro-12-imino-phthaloperine used in Example 11 there are used 27.5 parts of 1:2-diphenyl-10-imino-perine. The violet pigment so obtained melts at 360° C. with decomposition.

Example 16

A mixture of 27 parts of 12-imino-phthaloperine and 16 parts of β-phenylethylamine hydrochloride and 140 parts of nitrobenzene is stirred at 220° C. for 3 hours. The mixture is cooled and filtered and 40 parts of a light petroleum fraction which distills between 60° C.–80° C. are added to the filtrates.

The precipitate so obtained is filtered off and the solid is crystallised from a light petroleum fraction which distills between 100° C.–120° C. 12-(β-phenylethyl)-imino-phthaloperine is thus obtained in small orange needle-shaped crystals or leaflets which melt at 152° C.

What I claim is:
1. Coloring matter of the formula:

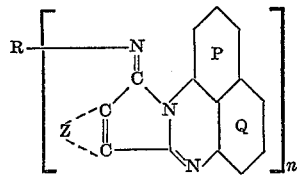

wherein R is selected from the group consisting of monocyclicaryl-lower alkyl radicals and aryl radicals; $n$ is an integer selected from the group consisting of one, two and three, Z represents the atoms necessary to complete a benzene ring and the nuclei P and Q carry substituents selected from the group consisting of hydrogen, halogen, alkoxy and the ethylene radical connected to the carbon atoms in the peri positions.

2. 12-p-ethoxyphenylimino-phthaloperine.
3. 12-phenylimino-phthaloperine.
4. 12-p-(6-methylbenzthiazolyl-2-)phenyl-iminophthaloperine.
5. p-Phenylene-bis-(12-imino-phthaloperine).
6. 1:5-naphthylene-bis-(12-imino-phthaloperine).
7. 12-(β-phenylethyl)-imino-phthaloperine.

References Cited in the file of this patent

Chemical Reviews, volume 35, pages 364 and 369 (1944).